Figure 4:
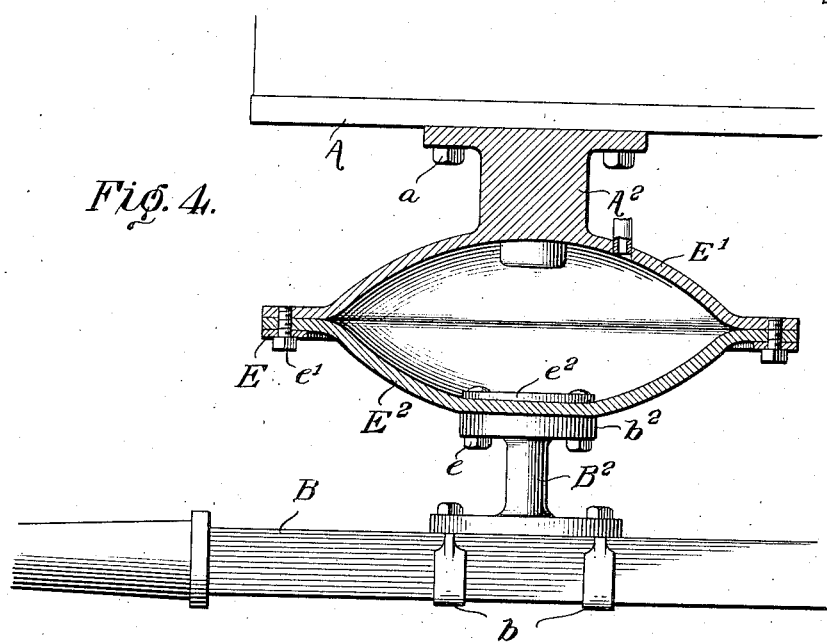

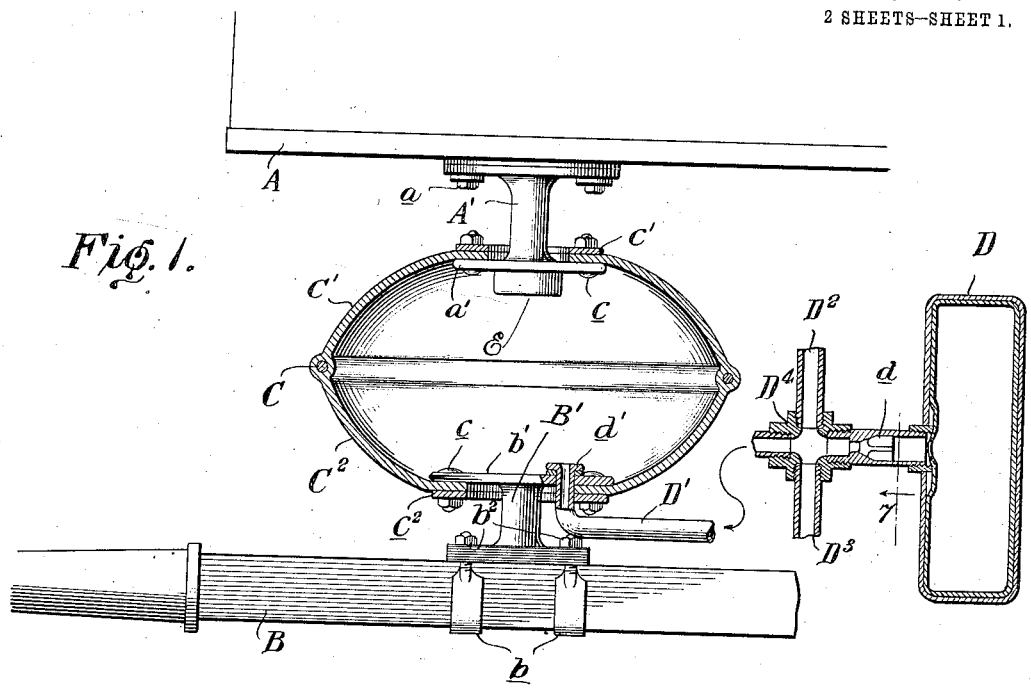
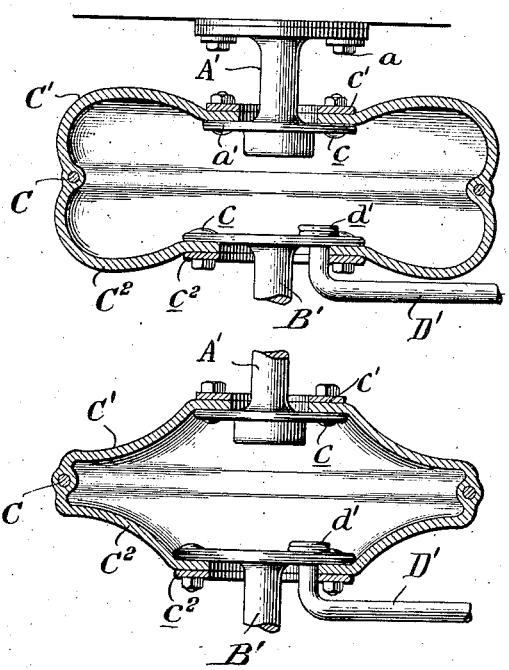
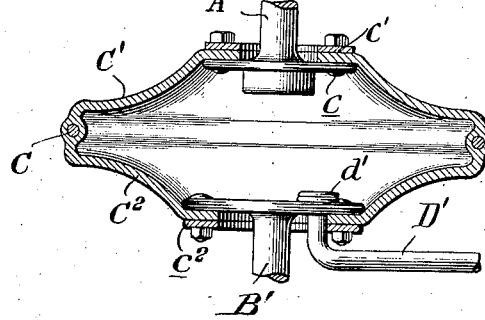

B. W. DAVIS.
SHOCK ABSORBER.
APPLICATION FILED JULY 22, 1907. RENEWED MAY 23, 1910.

1,111,739.

Patented Sept. 29, 1914.

2 SHEETS—SHEET 2.

Witnesses:
John Endure
J. Adolph Bishop

Inventor
Benjamin W. Davis,
By Sheridan and Wilkinson,
Attys.

UNITED STATES PATENT OFFICE.

BENJAMIN W. DAVIS, OF PHILLIPS, WISCONSIN.

SHOCK-ABSORBER.

1,111,739.
Specification of Letters Patent.
Patented Sept. 29, 1914.

Application filed July 22, 1907, Serial No. 384,982. Renewed May 23, 1910. Serial No. 563,001.

*To all whom it may concern:*

Be it known that I, BENJAMIN W. DAVIS, a citizen of the United States, residing at Phillips, in the county of Price and State of Wisconsin, have invented certain new and useful Improvements in Shock-Absorbers, of which the following is a specification.

My invention relates in general to apparatus for absorbing shocks; and more particularly to a pneumatic device for dissipating the vibrations of vehicles incident to their passage over uneven surfaces.

Pneumatic tires are recognized as affording the most perfect means for preventing the jolts and jars to which vehicle wheels are subjected from being communicated to the occupants of the vehicle. Pneumatic tires are, however, open to the very serious objection that they readily puncture, thereby not only causing annoyance and trouble, but also incurring much expense.

It has heretofore been proposed to interpose pneumatic springs or cushions between the axles and the bodies of vehicles in lieu of using pneumatic tires. One form of such devices, covered by my prior Patent No. 611,377, operates to retard the rebound by permitting a shock to expel air from a cushion and by restricting the return of the expelled air. In no pneumatic cushion heretofore devised, so far as I am aware, has the rebound been retarded by the action of atmospheric pressure upon the cushion when compressed, and it is the primary object of my present invention to provide a pneumatic spring which will not only prevent a rebound after compression by restricting the return of air expelled from the cushion, but also by the action of atmospheric pressure upon the cushion after compression, thereby permitting only a gradual expansion of the cushion, so that the shock of the recoil will be reduced to a minimum.

A further object of my invention is to provide a pneumatic spring for vehicles, which will be simple in construction, inexpensive in manufacture, and efficient in operation.

The embodiment of my invention herein disclosed may be generally described as comprising a pneumatic chamber interposed between two relatively movable parts, as, for instance, the axle and body of a vehicle, the chamber having a flexible wall which is normally distended, but which collapses after the expulsion of air from the pneumatic chamber. The chamber is provided with means for permitting the passage of air therefrom when it is compressed and for restricting the return of air thereto when it expands incident to the rebound of the connected parts. Means are provided for so supporting the flexible wall of the chamber that it will be distended against atmospheric pressure when the chamber expands, thereby utilizing the pressure of the atmosphere to retard the rebound.

My invention will be more fully described hereinafter with reference to the accompanying drawings, in which the same is illustrated as embodied in two convenient and practical forms, and in which—

Figure 5:
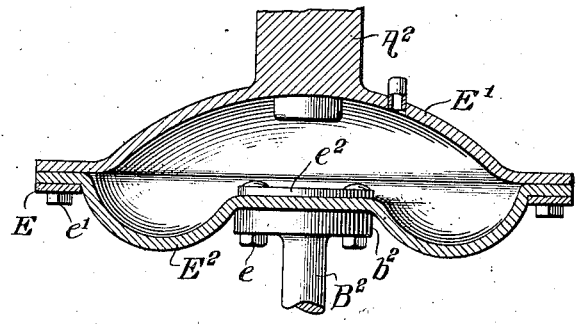
Figure 6:
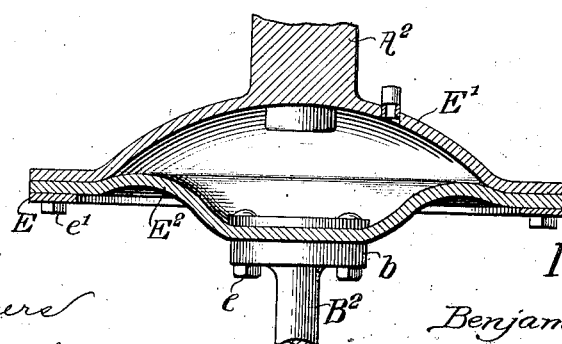

Figure 1 is a vertical sectional view, parts being shown in elevation. Fig. 2 is a view similar to Fig. 1, showing the chamber compressed. Fig. 3 is a view similar to Fig. 2, showing the position of the flexible walls of the chamber when the parts rebound. Fig. 4 is a view similar to Fig. 1, showing a modified form of my invention. Fig. 5 is a view of the modified form of my invention shown in Fig. 4, illustrating the chamber when subjected to a shock; Fig. 6 is a view similar to Fig. 5, showing the position of the flexible wall of the chamber during the rebound of the connected parts; and Fig. 7 is a sectional view on line 7, Fig. 1.

Similar reference characters are used to designate similar parts in the several figures of the drawings.

Referring more particularly to Figs. 1, 2 and 3, reference character A indicates a portion of a vehicle body, while B indicates a portion of one of the axles of the vehicle. It will, of course, be understood that my invention is not limited in its use to a vehicle spring, but is merely illustrated in such connection in order that one of its applications may be disclosed. Reference character A' designates a post depending from and rigidly secured to the vehicle body at a point above the axle, by any suitable means, as, for instance, bolts or screws a. B' designates a post secured to and projecting above the axle B at a point substantially below the bracket A'. Any suitable fastening devices may be employed for securing the post B' to the axle, such, for instance, as U-shaped straps b extending around the axle and through holes in the overlying base plate of the post, nuts being secured to the ends of the straps which project above the base of the post. C' and C² designate two portions of a flexible wall forming a pneumatic chamber. The upper wall C' is provided with an opening surrounding the post A' and overlying a circular flange a' projecting around the lower end of the post. Suitable fastening means are provided for securing the upper wall C' of the chamber to the flange a' of the post in order to prevent leakage of air, such means being shown as consisting in an annular washer c' overlying the flange a' and between which and the flange the edge of the upper wall of the casing is interposed. Suitable fastening devices, such, for instance, as bolts c, extend through the flange a', the overlying portion of the top wall of the chamber, and the annular washer c'. The lower wall C² of the pneumatic chamber is secured in a similar manner to the post B'. b' indicates a circular flange projecting around the upper end of the post B' and overlying the portion of the lower wall of the chamber which surrounds the post B'. c² designates an annular washer surrounding the post B' and underlying the portion of the lower wall of the chamber around the post. c indicates bolts for rigidly securing the lower wall of the chamber to the post B'. C designates a ring of any suitable rigid material which is secured to the chamber intermediate of the upper and lower walls thereof, so as to prevent the chamber from collapsing radially. A conduit D communicates with the interior of the chamber and connects the same with a reservoir D containing air under any desired pressure, located at any suitable point upon the vehicle. A check valve d is located in the conduit D and unseats toward the reservoir so as to permit air to be expelled from the chamber, when it is compressed, to the reservoir. The check valve d is provided with a restricted hole therethrough, as clearly shown in Fig. 7, so that the return of the air from the reservoir to the chamber will be gradual. E designates a projection alining with the posts A' and B' and depending within the chamber which, should the chamber collapse, will engage the upper end of the post B' and serve to support the body of the vehicle A. The projection E may be of any suitable material, such for instance as rubber.

When my improvement is used as a vehicle spring, four chambers are preferably employed, two interposed between each axle and the body of the vehicle. A single reservoir D may serve for receiving the compressed air from all of the chambers and for gradually returning the same to them, as indicated at the right of Fig. 1, in which reference characters D² and D³ indicate conduits leading from other chambers, all of such conduits being connected to a coupling with which the reservoir communicates.

When the connected parts, as for instance the axle and body of the vehicle, occupy their normal relation, the cushion assumes the position shown in Fig. 1. When, however, the parts tend to move toward each other, as for instance when the wheel on the adjacent end of the axle strikes a stone or enters a depression, the chamber is compressed, as indicated in Fig. 2. Such compression of the chamber forces air through the conduit to the reservoir, thereby permitting the connected parts to gradually approach each other. When the movement of the connected parts toward each other has been stopped, and the usual rebound or separation of the parts occurs, the walls of the chamber are moved apart, thereby producing partial vacuum in the chamber, owing to the check valve d preventing the return of air from the reservoir to the chamber in such quantity as to compensate for the increased interior capacity of the chamber. The partial vacuum formed in the chamber results in the atmospheric pressure forcing the walls thereof inwardly to the position shown in Fig. 3 during the initial rebound of the parts. The complete separation, or rebound, of the parts is, therefore, retarded by the atmospheric pressure as the separation of the posts necessarily tends to straighten the walls of the chamber between the distending ring C and the flanges around the posts.

In Figs. 4, 5 and 6 I have shown a modified form of my invention in which the chamber comprises merely one flexible wall, the other wall of the chamber being rigid. In the figures referred to E' indicates the upper wall of the chamber, which may conveniently be formed integrally with the lower end of the post A². E² indicates the flexible lower wall of the chamber which is secured to the lower post B² in any suitable manner, as by means of a plate e² between which and a flange b² around the upper end of the post B² the wall is secured. Any suitable fastening devices, as, for instance, bolts e, are used for securing the flexible wall E² to the post B². The flexible wall E² is secured at its outer periphery to the rigid upper wall E', so as to form an air tight chamber. Any suitable means may be provided for uniting the two walls of the chamber, as for instance, an annular washer E underlying the outer portion of the flexible wall and secured to the overlying portion of the rigid wall by screws e'.

In the modification of my invention above described, the chamber is connected with a reservoir containing compressed air in any suitable manner, as, for instance, by a conduit extending through the rigid upper wall of the chamber.

The operation of the modified form of my invention shown in Figs. 4, 5 and 6 is substantially the same as the operation of the form of my invention shown in Figs. 1, 2 and 3. When the connected parts are suddenly moved toward each other the air within the chamber is forced into the reservoir, thereby gradually retarding the movement of the two parts toward each other until such movement ceases. The flexible portion of the chamber assumes the position shown in Fig. 5 when the connected parts have ceased moving toward each other. The initial movements of the connected parts away from each other results in partial vacuum being formed in the chamber so that the flexible wall is forced inwardly to the position indicated in Fig. 6. The further separation of the connected parts consequently must straighten the flexible wall against the atmospheric pressure, thereby retarding the recoil of the connected parts.

From the foregoing description it will be observed that I have invented an improved shock absorbing device which is capable of various uses, and which serves to gradually diminish and finally stop the movement of the two connected parts toward each other, and which also serves to retard the separation of the parts by utilizing atmospheric pressure, thereby preventing sudden and injurious recoil of the connected parts. It will further be observed that my improved pneumatic cushion is exceedingly flexible and will permit the relative movement of the connected parts without liability of the chamber being so ruptured as to permit leakage.

I claim:

1. In a shock absorbing device, the combination with an expansible and compressible chamber containing fluid, of means for securing said chamber to two relatively movable members, means for permitting the expulsion of fluid from said chamber when compressed by the movement of said members toward each other, means for restricting the return of fluid to said chamber when expanded by the relative movement of said members apart, and means for utilizing the atmospheric pressure to retard the expansion of said chamber.

2. In a shock absorbing device, the combination with an expansible and compressible chamber having a flexible wall and containing fluid, means for securing said chamber to two relatively movable members, means for permitting the expulsion of fluid from said chamber when compressed, means for restricting the return of fluid to said chamber during expansion, and means for supporting said flexible wall so as to be forced against atmospheric pressure during the expansion of said chamber.

3. In a shock absorbing device, the combination of an expansible and compressible chamber airtight containing fluid under pressure and comprising a substantially hemispherical flexible wall, of means for securing said chamber directly to two relatively movable members, means for permitting the expulsion of fluid from said chamber during its compression, means for restricting the return of fluid to said chamber during its expansion, and means for holding said wall permanently distended transversely.

4. In a shock absorbing device, the combination with an expansible and compressible chamber containing fluid, of means for securing said chamber to two relatively movable members, means for permitting the expulsion of fluid from said chamber when compressed by the movement of said members toward each other and for permitting the return of fluid to said chamber when expanded by the relative movement of said members apart, and means for utilizing the atmospheric pressure to retard the expansion of said chamber.

5. In a shock absorbing device, the combination with an extensible and compressible air-tight chamber containing fluid, of means for securing said chamber directly to two relatively movable members between which the chamber is interposed, means for permitting the expulsion of fluid from said chamber when compressed by the movement of said members toward each other and for permitting the return of fluid to said chamber when expanded by the relative movement of said members apart, and a projection extending within said chamber to support one of the movable members upon the other should said chamber collapse.

6. In a shock absorbing device, the combination with an expansible and compressible chamber containing fluid under pressure and comprising two substantially semi-spherical flexible walls, means for respectively securing said walls to two relatively movable members, means for permitting the expulsion of fluid from said chamber when compressed by the movement of said members toward each other and permitting the return of fluid to said chamber when expanded by the relative movement of said members apart, and an inexpansible ring interposed between and secured to said semi-spherical walls for holding said chamber permanently distended intermediate of the connections with the relatively movable members.

BENJAMIN W. DAVIS.

Witnesses:
GEO. L. WILKINSON,
ANNA L. SAVOIE.